United States Patent [19]
Hazelman

[11] Patent Number: 6,077,009
[45] Date of Patent: Jun. 20, 2000

[54] BLIND FASTENER WITH HIGH STRENGTH BLIND HEAD AND HIGH CLAMP AND HIGH SHEAR LOAD RESISTANCE

[75] Inventor: David J. Hazelman, Tucson, Ariz.

[73] Assignee: Huck International, Inc., Tucson, Ariz.

[21] Appl. No.: 09/289,203

[22] Filed: Apr. 9, 1999

[51] Int. Cl.[7] .................................................. F16B 13/04
[52] U.S. Cl. .................................. 411/43; 411/34; 411/69
[58] Field of Search ................................ 411/34, 43, 45, 411/46, 69, 70

[56] References Cited

U.S. PATENT DOCUMENTS

| | | |
|---|---|---|
| Re. 20,055 | 8/1936 | Huck . |
| Re. 21,058 | 4/1939 | Huck . |
| 2,061,628 | 11/1936 | Huck . |
| 2,385,886 | 10/1945 | Shaff . |
| 2,397,111 | 3/1946 | Huck . |
| 2,538,623 | 1/1951 | Keating . |
| 2,545,752 | 3/1951 | Singleton . |
| 2,546,602 | 3/1951 | Keating . |
| 2,652,741 | 9/1953 | Ketchum et al. . |
| 2,756,624 | 7/1956 | Austin . |
| 2,887,003 | 5/1959 | Brilmyer . |
| 3,038,626 | 6/1962 | Simmons . |
| 3,107,572 | 10/1963 | Orloff . |
| 3,148,578 | 9/1964 | Gapp . |
| 3,178,989 | 4/1965 | Siebol . |
| 3,257,890 | 6/1966 | Kraemer . |
| 3,285,121 | 11/1966 | Siebol . |
| 3,292,482 | 12/1966 | Fry et al. . |
| 3,300,798 | 1/1967 | York . |
| 3,302,510 | 2/1967 | Gapp . |
| 3,309,747 | 3/1967 | Smith . |
| 3,348,444 | 10/1967 | Brignola . |
| 3,369,289 | 2/1968 | Gapp . |
| 3,390,601 | 7/1968 | Summerlin . |
| 3,515,419 | 6/1970 | Baugh . |
| 3,553,040 | 1/1971 | Bell . |
| 3,643,544 | 2/1972 | Massa . |
| 3,880,042 | 4/1975 | Binns . |
| 3,937,123 | 2/1976 | Matuschek et al. . |
| 4,012,984 | 3/1977 | Matuschek . |
| 4,044,591 | 8/1977 | Powderley . |
| 4,074,608 | 2/1978 | Siebol . |
| 4,089,249 | 5/1978 | Binns . |
| 4,137,817 | 2/1979 | Siebol . |
| 4,168,650 | 9/1979 | Dahl et al. . |
| 4,170,919 | 10/1979 | Siebol . |
| 4,170,920 | 10/1979 | Siebol . |
| 4,211,145 | 7/1980 | Dolch . |
| 4,222,304 | 9/1980 | Yoshida et al. . |
| 4,230,017 | 10/1980 | Angelosanto . |
| 4,261,245 | 4/1981 | Mauer . |
| 4,293,258 | 10/1981 | McKewan . |
| 4,312,613 | 1/1982 | Binns . |

(List continued on next page.)

FOREIGN PATENT DOCUMENTS

| | | | |
|---|---|---|---|
| 3612501 | 10/1987 | Germany | ................................. 411/43 |
| 472329 | 9/1937 | United Kingdom . | |
| 594859 | 11/1947 | United Kingdom | ..................... 411/43 |
| 1059696 | 2/1967 | United Kingdom | ..................... 411/43 |

*Primary Examiner*—Flemming Saether
*Attorney, Agent, or Firm*—Harness, Dickey & Pierce, P.L.C.

[57] ABSTRACT

A blind fastener with a pin having a pin shank which extends through a cylindrical main sleeve and expansion sleeve whereby it can be gripped and pulled by an installation tool with the pin having an enlarged pin head at the blind end of the pin shank. The expansion sleeve is located between the pin head and the inner end of the main sleeve and is adapted to move into the inner or blind end of the main sleeve to form a first tulip shaped blind head for clamping workpieces together in response to a relative axial force applied between the sleeves and pin by engagement of the pin head with the expansion sleeve. As the axial force is increased the pin head is moved into the expansion sleeve to form a second tulip head to further clamp the workpieces and to secure the pin, main sleeve and expansion sleeve together at that end and is moved closely adjacent the workpiece surface at the blind side to form a high strength blind head.

22 Claims, 5 Drawing Sheets

U.S. PATENT DOCUMENTS

| | | |
|---|---|---|
| 4,355,934 | 10/1982 | Denham et al. . |
| 4,364,697 | 12/1982 | Binns . |
| 4,367,994 | 1/1983 | Francis et al. . |
| 4,370,081 | 1/1983 | Briles . |
| 4,388,031 | 6/1983 | Rodgers . |
| 4,451,189 | 5/1984 | Pratt . |
| 4,473,914 | 10/1984 | Haft . |
| 4,556,351 | 12/1985 | Wollar et al. . |
| 4,579,491 | 4/1986 | Kull . |
| 4,580,936 | 4/1986 | Francis et al. . |
| 4,585,383 | 4/1986 | Kraemer . |
| 4,609,315 | 9/1986 | Briles . |
| 4,609,317 | 9/1986 | Dixon et al. . |
| 4,615,655 | 10/1986 | Dixon . |
| 4,620,825 | 11/1986 | Potzas . |
| 4,627,775 | 12/1986 | Dixon . |
| 4,639,174 | 1/1987 | Denham et al. . |
| 4,678,384 | 7/1987 | Sparling et al. . |
| 4,696,610 | 9/1987 | Wright . |
| 4,702,655 | 10/1987 | Kendall . |
| 4,736,560 | 4/1988 | Murphy . |
| 4,765,787 | 8/1988 | Briles . |
| 4,781,500 | 11/1988 | Mauer . |
| 4,781,501 | 11/1988 | Jeal et al. . |
| 4,784,551 | 11/1988 | Kendall . |
| 4,789,283 | 12/1988 | Crawford . |
| 4,806,053 | 2/1989 | Herb . |
| 4,826,372 | 5/1989 | Kendall . |
| 4,836,728 | 6/1989 | Mauer et al. . |
| 4,850,771 | 7/1989 | Hurd . |
| 4,859,128 | 8/1989 | Brecz et al. . |
| 4,863,325 | 9/1989 | Smith . |
| 4,865,499 | 9/1989 | Lazey . |
| 4,877,363 | 10/1989 | Williamson et al. . |
| 4,900,205 | 2/1990 | Sadri . |
| 4,907,922 | 3/1990 | Jeal et al. . |
| 4,909,687 | 3/1990 | Bradley et al. . |
| 4,919,576 | 4/1990 | Louw et al. . |
| 4,950,115 | 8/1990 | Sadri . |
| 4,958,971 | 9/1990 | Lazey et al. . |
| 4,968,198 | 11/1990 | Binns . |
| 4,987,003 | 1/1991 | Schuster et al. . |
| 4,988,247 | 1/1991 | Summerlin . |
| 4,990,042 | 2/1991 | Szayer et al. . |
| 5,006,024 | 4/1991 | Siebol . |
| 5,030,050 | 7/1991 | Auriol et al. . |
| 5,044,850 | 9/1991 | Getten et al. . |
| 5,131,107 | 7/1992 | Pratt et al. . |
| 5,135,340 | 8/1992 | Stinson . |
| 5,141,373 | 8/1992 | Kendall . |
| 5,178,502 | 1/1993 | Sadri . |
| 5,197,838 | 3/1993 | Schwab . |
| 5,213,460 | 5/1993 | Sadri et al. . |
| 5,320,465 | 6/1994 | Smith . |
| 5,346,348 | 9/1994 | Denham . |
| 5,378,098 | 1/1995 | Andrews et al. . |
| 5,429,464 | 7/1995 | Eshraghi . |
| 5,569,006 | 10/1996 | Alvarado et al. . |
| 5,599,147 | 2/1997 | Luhm . |
| 5,603,592 | 2/1997 | Sadri et al. . |
| 5,651,649 | 7/1997 | Sadri et al. . |

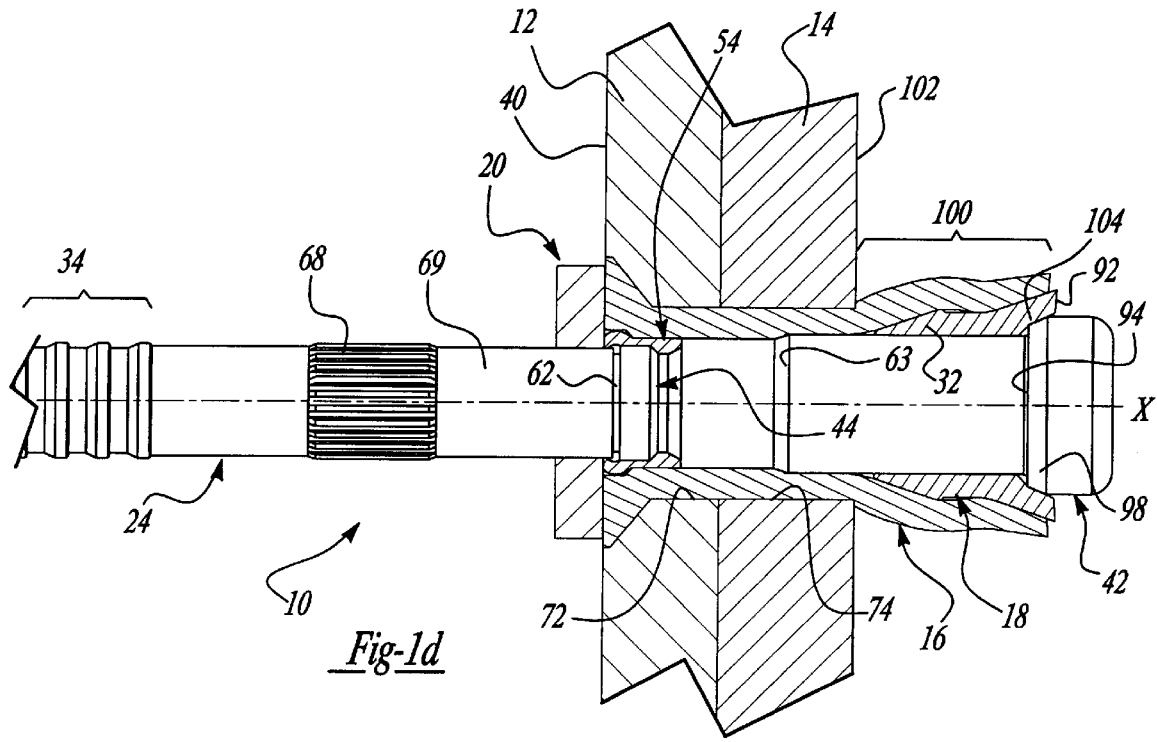
_Fig-1d_
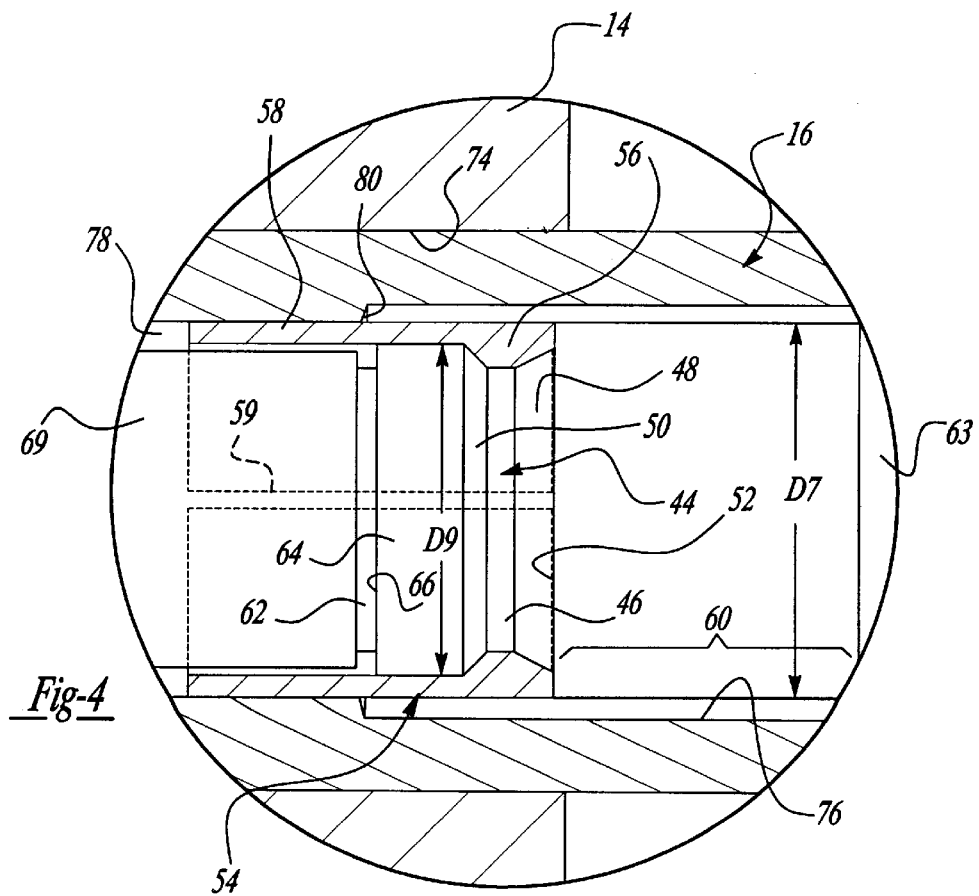
_Fig-4_

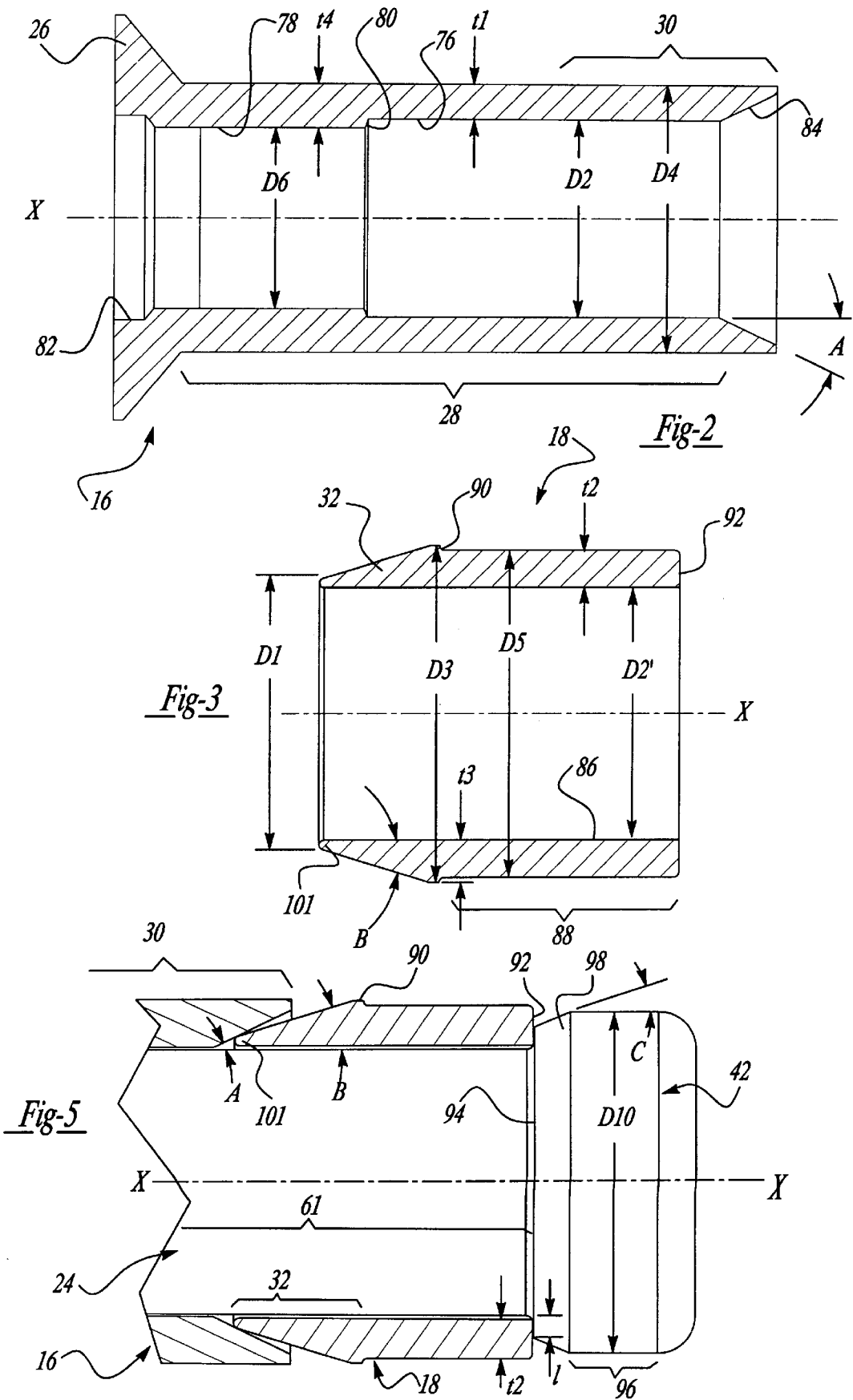

BLIND FASTENER WITH HIGH STRENGTH BLIND HEAD AND HIGH CLAMP AND HIGH SHEAR LOAD RESISTANCE

SUMMARY BACKGROUND OF THE INVENTION

The present invention relates to a blind fastener wherein a main sleeve and expander sleeve are assembled onto a pin shank of a pin member having an enlarged pin head with the expander sleeve at the blind end in engagement with the pin head such that as a relative axial force is applied between the pin and the sleeves the expander sleeve is moved into the adjacent end of the main sleeve to expand that end radially outwardly to form a first tulip shaped blind head and with the pin head then moving into the expander sleeve to form a second tulip shaped blind head.

In securing workpieces together with a blind fastener it is desirable to be able to attain a high final clamp load on the workpieces. At the same time it is also desirable that the installed fastener have the capability of withstanding high shear loads. The magnitude of clamp load is established by the relative axial force applied between the pin and a sleeve structure essentially when the blind head is formed and engages the rear surface of the inner workpiece. Typically, as this is occurring, the pin moves axially relative to the sleeve structure until a breakneck groove reaches an enlarged sleeve head at the outer end of the outer workpiece where a front lock is formed and the pin is fractured at the breakneck groove to result in a flush final structure. The extra load to provide pin break, however, does not necessarily increase the clamp load.

The form and strength of the blind head and lock structure of the installed fastener securing the final magnitude of clamp load can be a significant factor in determining the shear load capability of the installed fastener and fastened joint. In many applications the shear load capability of a fastened joint is of prime importance. Shear loads are present on the installed fastener through the fastened joint by loads applied to the workpieces in opposite radial directions which are transverse to the axis of the fastener. This form of loading is frequently referred to as lap shear and, of course, is in contrast to pure tensile loads which are applied to the workpieces in opposite axial directions along the axis of the installed fastener. When such lap shear loads are applied to a fastener, however, there routinely is a component of resultant tensile load applied to the fastener as well. It is believed that this is caused to some extent by the fact that since the workpieces are axially offset the shear loads as applied to the workpieces in opposite transverse directions, will result in some degree of bending or twisting which will cause an uneven axial load to be applied to the installed fastener. The pin and sleeve, however, are routinely, axially retained together to resist tensile loads. Such retention is frequently provided by the enlarged sleeve head, the lock formed by the locking ring or collar at the outer or open end and by the blind head at the inner or blind end. However, the uneven tensile loads or forces resulting from the lap shear loads can cause some axial displacement or deformation of the blind head structure relative to the front lock and/or the enlarged sleeve head. This could result in a reduction in the clamp load whereby the workpieces could now rotate or otherwise move relative to each other resulting in an ultimate deterioration of the fastened joint.

In the present invention, this problem is alleviated by forming a high strength blind head structure having two, interengaging blind heads of a tulip configuration and by overengagement of the pin head by the blind head structure. At the same time the clamp load attainable can be of a high magnitude. Here the first blind head is formed in a main sleeve by an expander sleeve. The expander sleeve is mounted in engagement with the pin head and is moved into the blind side end of the main sleeve in response to a relative axial force applied between the pin and sleeves to form the first blind head of a tulip shape to engage the inner workpiece surface and to thereby initiate clamping of the workpieces. Now as the relative axial force is increased the expander sleeve is moved fully into the main sleeve to further increase the clamp load while substantially increasing the strength of the blind head. In this regard the pin head and expander sleeve are provided with interengaging flat, non-tapered surfaces whereby a high strength blind head is formed and a high clamp load can be attained before the pin head moves into the expander sleeve. Now with the expander sleeve fully seated within the main sleeve, as the relative axial force continues to increase, the pin head is moved into the inner end of the expander sleeve to radially expand the expander sleeve to form the second blind head also of a tulip shape. At the same time this acts to further strengthen the blind head and to secure the first tulip shaped blind head on the main sleeve with the second tulip shaped blind head on the expander sleeve. This results in further securing the fastener members at the blind head side. While this is occurring the pin shank is moved gradually, with the clamp load maintained, to a desired final position where a front lock is engaged to lock the pin member and main sleeve together and at which position the breakneck groove is essentially in line with the outer end of the main sleeve. Now as the relative axial force is increased further the breakneck groove will be fractured completing the installation.

As this happens the expander sleeve because of its resilient strength in the area of the second tulip shaped blind head will exert a radially inward gripping force on the pin head. At the same time it will move radially into engagement with and over the pin head to help retain or lock the expander sleeve and pin member from moving relatively to each other which could result in clamp load being reduced or lost. In addition the leading end of the expander sleeve which is engaged by the material of the tuliped main sleeve will be urged radially inwardly into engagement with the pin shank to assist in retaining the expander sleeve to the pin member and main sleeve. Thus these areas of retention or locking engagement at the blind side are in addition to the front lock securing the pin member and main sleeve together to thus further secure the joint. These retention features plus the high strength of the blind head and the high magnitude of clamp load attainable increase the resistance of the fastener components from loosening from the tensile forces resulting from lap shear loads.

At the same time the expander sleeve and main sleeve are constructed such that the distance the pin head will move into the expander sleeve will vary depending upon the grip range of the fastener, i.e. to accommodate variations in total thickness of the workpieces being joined. Such variation of inward movement, however, will occur only after the blind head structure has been fully formed and the above noted retention structures have been formed thereby having little effect on the magnitude of final clamp load attainable and the strength of the structure retaining such load over the grip range including the strength of the blind head.

Therefore it is an object of the present invention to provide a unique blind type fastener including a pin member, a main sleeve and an expander sleeve adapted to form a blind head structure interlocking the expander sleeve into the main sleeve and onto the pin member and a front lock retaining the pin and main sleeve at the accessible side whereby a high clamp load attained on workpieces by the fastener is substantially retained by the locking structure whereby tensile forces resulting from high lap shear loads, which could loosen the fastened joint, are resisted.

Thus it is another object of the present invention to provide a unique blind type fastener including a pin member, a main sleeve and an expander sleeve with a first tulip shaped blind head being formed by movement of the expander sleeve into the main sleeve and a second tulip shaped blind head being formed by subsequent movement of the pin head into the opposite end of the expander sleeve resulting in a high strength blind head and high clamp load with the sleeves and pin member being substantially retained or locked together at the blind side whereby tensile forces resulting from high lap shear loads, which could loosen the fastened joint, are resisted.

It is still another object of the present invention to provide a unique blind type fastener in which a high strength blind head is formed and the final clamp load is secured from reduction due to tensile loads resulting from high lap shear loads.

Other objects, features, and advantages of the present invention will become apparent from the subsequent description and the appended claims, taken in conjunction with the accompanying drawings, in which:

DESCRIPTION OF THE DRAWINGS

FIGS. 1b–1e are sequence drawings depicting the fastener of FIG. 1a at different stages of the installation of the workpieces from the start condition of FIG. 1a to completion in FIG. 1e with FIGS. 1b–1d being shown in reduced scale and with FIG. 1e shown in enlarged scale;

FIG. 2 is a side elevational sectional view, to enlarged scale, of the main-sleeve of the fastener;

FIG. 3 is a side elevational sectional view, to enlarged scale, of the expander sleeve of the fastener;

FIG. 4 is a fragmentary elevational view, to enlarged scale, of the section of the fastener taken generally in the area of the Circle 4 in FIG. 1a and with the locking collar shown in section and with the portion broken away shown in dotted lines; and FIG. 5 is a fragmentary elevational view, to enlarged scale, of the section of the fastener taken generally in the area of the blind side of the fastener in FIG. 1a and including the pin head, a portion of the pin shank, the expander sleeve and the engaged portion of the main sleeve.

DESCRIPTION OF EMBODIMENTS OF THE INVENTION

Figure 1A:
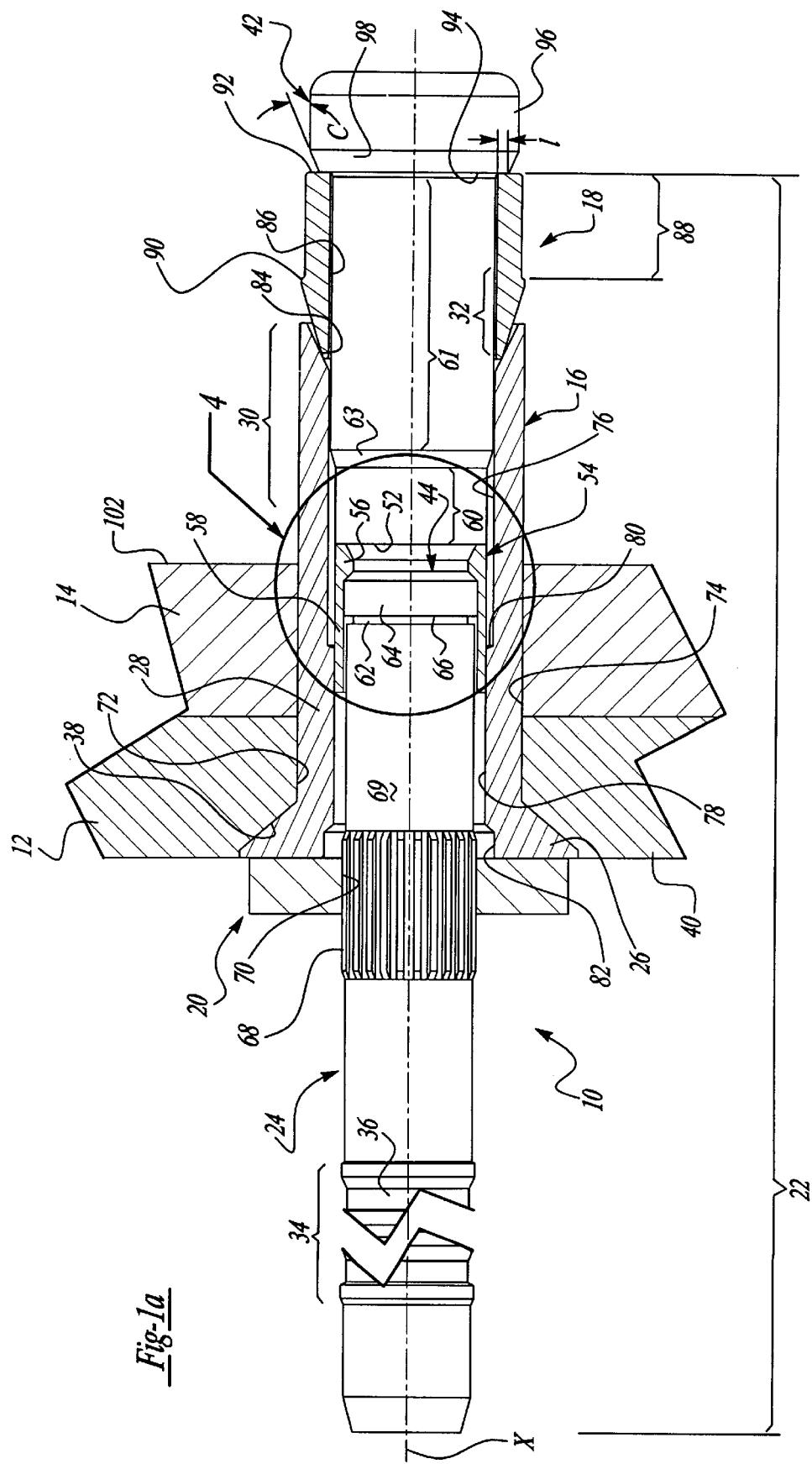
FIG. 1a is a side elevational view of the blind fastener of the present invention with some parts shown in section and including a pin member shown partly broken away, a main sleeve, an expander sleeve, locking collar and anvil washer as initially assembled to workpieces to be fastened together.
Figure 1B:
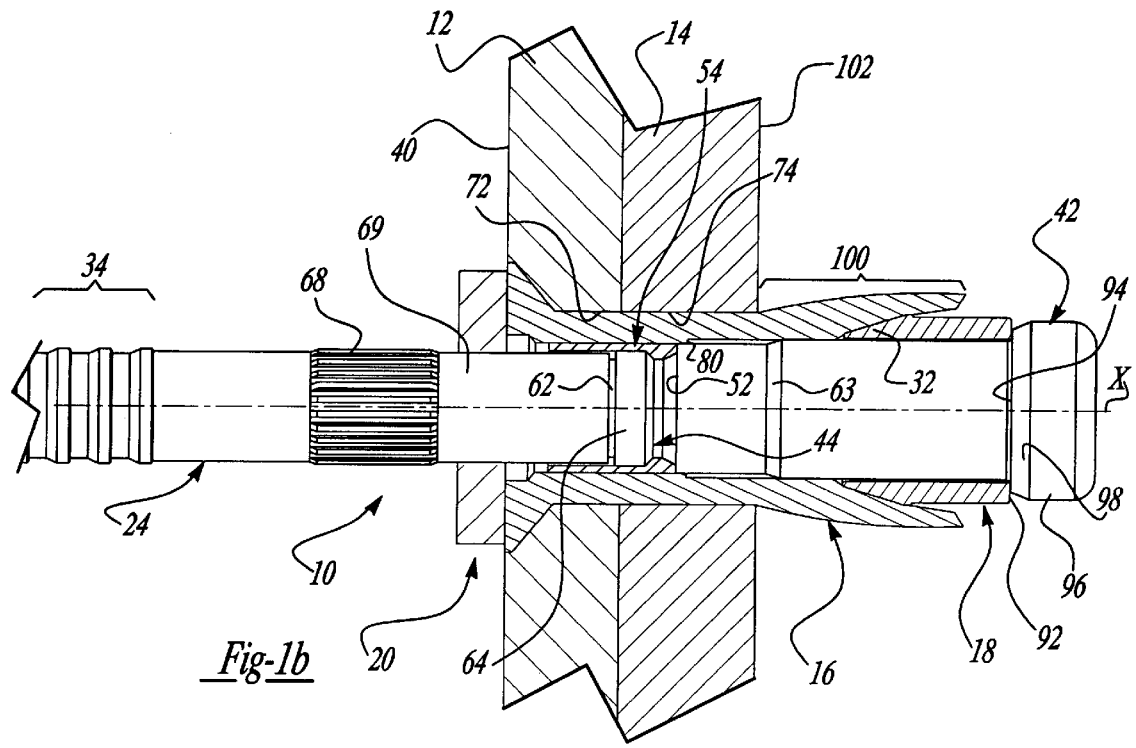
Figure 1C:
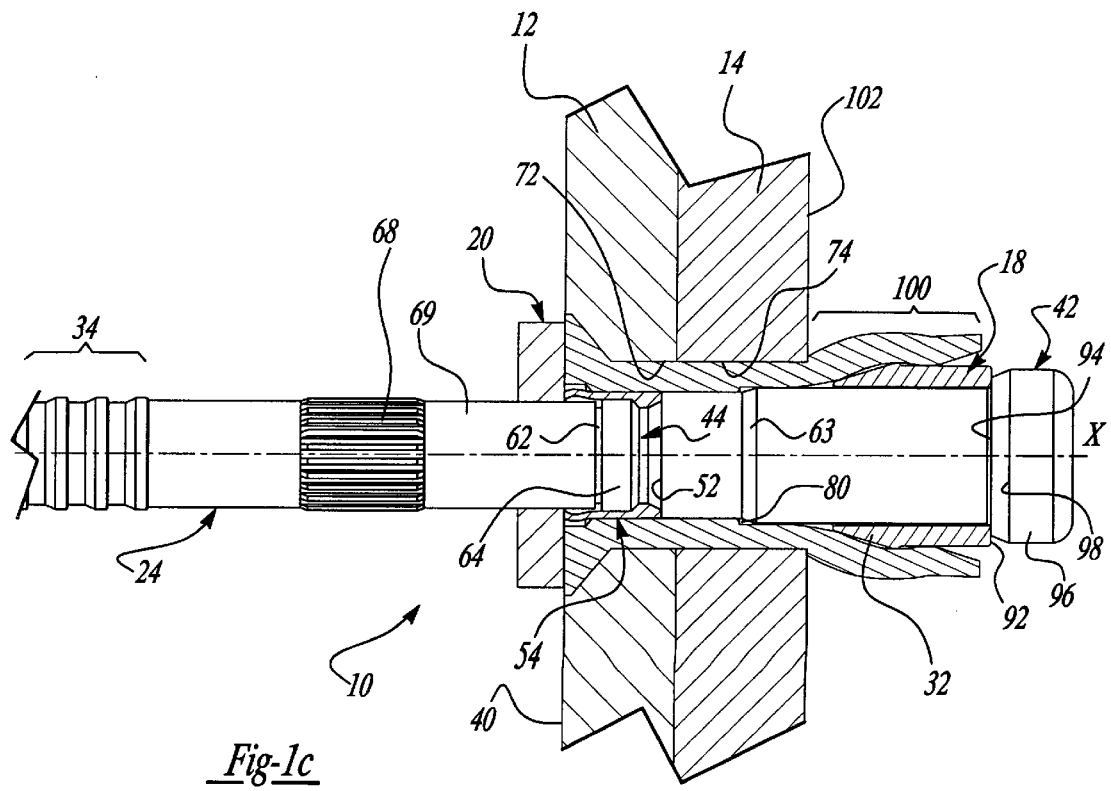

The fastener 10 as shown in FIG. 1a is adapted to secure together outer and inner workpieces 12 and 14, respectively, and consists of a main sleeve 16, an expander sleeve 18 and an anvil washer 20 all supported upon the shank 22 of a pin member 24. The main sleeve 16 is of a tubular form and has an enlarged head 26 on the outer end of a cylindrical sleeve shank 28. The cylindrical shank 28 terminates at its inner or blind side end in a radially expandable, blind head section 30. The expander sleeve 18 is of a cylindrical form and has a tapered expansion section 32 which as will be seen is adapted to engage the blind head section 30 of the main sleeve 16 to form a blind head. The details of the main sleeve 16 and expander sleeve 18 can best be seen in FIGS. 2 and 3, respectively.

As can be seen in FIG. 1a, the elongated shank 22 of pin member 24 extends through the main sleeve 16 and expander sleeve 18. The pin shank 22 has a pulling portion 34 at its outer end, which is provided with a plurality of annular pull grooves 36 so that it can be gripped by a conventional pull type tool. Such tools are well known in the art and therefore the details thereof have been omitted for purposes of brevity and simplicity.

The enlarged main sleeve head 26 is of the flush or conical type and is adapted to fit in a tapered counterbore 38 in the outer surface 40 of the outer workpiece 12. It should be understood that the main sleeve 16 could be of the type with an enlarged protruding head. The pin member 24 has an enlarged pin head 42 at the blind end of the pin shank 22 which operates in a manner to be described whereby the blind head section 30 of the main sleeve 16 is expanded into an enlarged, high strength blind head as shown in the sequence drawings of FIGS. 1a–1e for clinching the workpieces 12 and 14 together under a high clamp load.

The segment of the pin shank 22 between the lock groove 44 and the pin head 42 is of a stepped construction and includes a first small diameter portion 60 connected to a larger diameter hole filling second portion 61. An annular lock groove 44 is formed on the pin shank 22 at a distance from the pin head 42 within the grip range of the fastener 10 so that, upon completion of the installation after the workpieces 12 and 14 have been clinched together and a blind head structure formed, the lock groove 44 is still within the enlarged sleeve head 26 of main sleeve 16. The grip range of a fastener, such as fastener 10, is the range of total thicknesses of the workpieces 12 and 14 from a minimum total thickness to a maximum total thickness which it can secure together. The lock groove 44 has an annular root portion 46 with conical sections 48 and 50 at opposite ends. (See FIG. 4).

The inner conical section 48 of root portion 46 is connected to the first shank portion 60 which is of a diameter greater than conical section 48 to define an enlarged, straight pin shank shoulder 52. A lock collar 54 has a locking boss 56 of increased thickness which fits into the annular locking groove 44 as shown in FIG. 4. A reduced thickness lock sleeve portion 58 of the lock collar 54 extends forwardly or outwardly along the pin shank 22. The locking collar 54 is of a uniform cylindrical configuration and is of a circumferentially open construction defined by a narrow axial slit 59 shown in dotted lines in FIG. 4. The open construction permits the lock collar 54 to be resiliently, radially expanded to facilitate its assembly into the lock groove 44. The enlarged, straight pin shank shoulder 52 is adapted to bear against the radially outer end of the boss 56 of the locking collar 54 to thereby move the locking collar 54 with the pin member 24 and, as will be seen, to apply the load to the locking collar 54 to form the front lock.

The juncture between the small diameter pin shank portion 60, of diameter D7, and the hole filling pin shank portion 61, of larger diameter D8, defines a tapered shoulder 63 which serves a purpose to be described. A weakened breakneck groove 62 is located on the pin shank 22 spaced outwardly from the lock groove 44. An annular land 64 is located between the lock groove 44 and the breakneck groove 62 and is of an increased diameter D9 so as to form a pin stop shoulder 66.

The pin shank 22 has a splined portion 68 located between the pull portion 34 and the breakneck groove 62. The splined portion 68 is of a larger diameter than the pull portion 34 such as to provide an interference fit with the through bore 70 of the anvil washer 20. The anvil washer 20 is adapted to engage the enlarged sleeve head 26 and to react against the lock collar 54. The interference fit of the anvil washer bore 70 with the splined portion 68 holds anvil washer 20, the main sleeve 16 and expander sleeve 18 assembled to the pin member 24 to facilitate handling of the fastener 10. In this regard, the splined portion 68 is connected to the outer end of the breakneck groove 62 by a smooth shank portion 69 which is of a reduced diameter so as to be able to pass through the anvil washer bore 70 in clearance. In this regard, the pull portion 34 can also pass through the anvil washer bore substantially in clearance.

Looking now to FIGS. 1a and 2 the cylindrical shank 28 of the main sleeve 16 is of a uniform outside diameter D4 adapted to be received within through bores 72 and 74 through the workpieces 12 and 14, respectively. As noted the bore 72 terminates at its outer end in the large diameter tapered or countersunk counterbore 38. The main sleeve 16 has an internally stepped bore including an enlarged bore portion 76 at its inner or blind end extending through the blind head section 30. The enlarged bore portion 76 has a diameter D2 and extends to a reduced diameter bore portion 78 of a smaller diameter D6 whereby a tapered sleeve shoulder 80 is defined at the juncture to facilitate radial expansion and filling of at least a portion of one of the workpiece bores such as workpiece bore 74 by the engagement with the tapered shoulder 63 of pin shank portion 61. With this stepped structure the wall thickness t1 of the large diameter bore portion 76 is less than the wall thickness t4 at the small diameter bore portion 78. The main sleeve head 26 has an annular counterbore or recess 82 at the outer end of the bore portion 78 for a purpose to be described. The larger bore portion 76 at the blind head section 30 of main sleeve 16 is of the straight diameter D2 which terminates at its inner end in a radially outwardly tapered bore segment 84 which serves a purpose to be described. The bore segment 84 tapers at an angle A relative to the central axis X of the main sleeve 16 and hence of the fastener 10.

Looking now to FIG. 3, the expander sleeve 18 has a generally uniform through bore 86 which is of a diameter D2' generally the same as the diameter D2 of the larger, main sleeve bore portion 76. The expansion section 32 has a tapered outer surface which tapers radially outwardly at an angle B relative to axis X of the fastener 10 which angle is generally equal to or preferably slightly less than the angle A of taper of the tapered main sleeve bore segment 84. The expansion section 32 tapers from an outside diameter D1 slightly greater than the diameter D2 of bore portion 76 of main sleeve 16 to a preselected larger end diameter D3 which in one form of the invention was generally equal to the outside diameter D4 of the sleeve shank 28 including the blind head section 30 of the main sleeve 16. The expansion section 32 of the expander sleeve 18 is connected to a straight shank portion 88 of a reduced generally uniform outside diameter D5 to define an annular shoulder 90 at that juncture which has a wall thickness of t3. The opposite or outer end surface 92 of the expander sleeve shank portion 88 is generally, transversely flat.

The enlarged pin head 42 is connected to the enlarged diameter pin shank portion 61 by a shoulder 94 which extends radially, transversely and normally to the central axis X. The shoulder 94 at its radially outer end is connected to an enlarged diameter, axially straight head portion 96 by a radially outwardly tapered section 98. The head portion 96 which is of uniform diameter D10 in turn tapers arcuately, radially inwardly at its rearward end.

Looking now to FIGS. 1a and 5, as pre-assembled the tapered expansion section 32 of the expander sleeve 18 is adapted to nest matingly within the tapered segment 84 of the bore portion 76 of the main sleeve 16. At the same time the rearward or blind end flat surface 92 of the sleeve shank portion 88 is in planar engagement with the flat pin head shoulder 94.

Now in installing the fastener 10, as seen in the sequence drawings of FIGS. 1a–1e, a relative axial force is applied between the pin member 24 and the expander sleeve 18 and main sleeve 16 by a pull tool which grips the pull grooves 36 of pull portion 34 with the tool having an anvil member engaging the anvil washer 20. The anvil washer 20 at the same time transmits the load to the main sleeve 16 by its engagement with the large main sleeve head 26. As this occurs the pin head shoulder 94 by engagement with the end sleeve surface 92 applies an axial force on the expander sleeve 18 which in turn applies an axial force on the main sleeve 16 via the expansion section 32. As the load increases the tapered expansion section 32 is moved axially into the blind head section 30 as guided by the tapered bore segment 84. This causes the blind head section 30 to be expanded radially outwardly to form a first tulip shaped head 100 (see FIGS. 1b–1d). This continues until the leading end 101 of the tapered expansion section 32 is substantially at the rear or blind side surface 102 of inner workpiece 14. (See FIG.1d). In this regard the leading end 101 of the tapered expansion section 32 will be separated from the blind side surface 102 by a distance generally no greater than the wall thickness t1 of the main sleeve blind head section 30. This will result in the formation of the first blind head 100 having substantial strength. In other words the leading end 101 will be substantially in line with the blind side surface 102 which will increase the radial expansion of the blind head section 30 at the blind side surface 102 to provide the blind head 100 of high strength. (See FIG. 1d). In this condition the clamp load on the workpieces 12 and 14 is essentially secured by the blind head 100 at the blind side surface 102 and enlarged sleeve head 26 at the counterbore 38. However, the lock collar 54 is still not in position to create the lock between the pin member 24 and the main sleeve 16 at the outer or open end. Now as the relative axial force is increased the pin head 42 is moved axially inwardly past the end surface 92 of the expander sleeve shank portion 88 to form a second tulip shaped blind head 104 (see FIGS. 1d and 1e). It should be noted that the pin head shoulder 94 extends radially for a distance l which is less than the wall thickness t2 or radial length of the flat end surface 92. (See FIG. 5). The limited radial length l of the pin head shoulder 94 relative to the wall thickness t2 at the end surface 92 is selected to provide sufficient resistance to movement of the pin head 42 into the expander sleeve 18 until after the first blind head 100 is substantially fully formed. In this regard, this facilitates the maximization of the axial movement of the leading end 101 of the expansion section 32 into the blind head section 32 to a position proximate to the blind side surface 102 resulting in maximizing the strength of the blind head 100 and the magnitude of final clamp load. At the same time, the wall thickness t2 of the straight shank portion 88 is also selected to resist buckling. Along this same line, the amount of flat planar engagement of pin head shoulder 94 and sleeve end surface 92 and the relative hardness of the materials also resists shearing of the sleeve end surface 92 as the pin head 42 eventually moves into the expander sleeve 18. In one form of the invention the pin head shoulder 94 extended for the length l of around one half of the thickness t2 of the sleeve shank portion 88 including the flat end surface 92. Now the pin head 42 will be moved axially inwardly into the expander sleeve 18 until the lock sleeve portion 58 of the lock collar 54 is in engagement with the anvil washer 20. As the relative axial pulling force exerted on the pin shank 22 and on the sleeve head 26 increases the lock sleeve portion 58 is deformed radially outwardly to form an interlocking annular flange 106 in the recess 82, to firmly interlock the pin shank 22 with the main sleeve 16. The spacing between the lock groove 44 and the breakneck groove 62 in relation to the lock sleeve portion 58 of the lock collar 54 is such that when the lock sleeve portion 58 of the lock collar 54 is fully expanded into the main sleeve head recess 82 the tapered pin shoulder 63 has engaged the tapered sleeve shoulder 80 and has moved partially into the reduced diameter bore portion 78 to radially expand the sleeve shank 28 in that area to fill the workpiece bore 74 for a limited axial length. At the same time the pin stop shoulder 66 has engaged the anvil washer 20. When this occurs further relative axial force on the pin shank 22 will be resisted and cause the pin shank 22 to break at the weakened breakneck groove 62 at about the outer surface of the sleeve head 26. The locking sleeve portion 58 of the lock collar 54 initially overlaps the breakneck groove 62 sufficiently to provide for the formation of the interlocking flange 106, by the time the pin stop shoulder 66 abuts the anvil washer 20. It should be noted that the tapered, mating surfaces on the pin shoulder 63 and sleeve shoulder 80 still permits axial movement of the pin member 24 whereby the final desired alignment of the breakneck groove 62 with the outer surface of the sleeve head 26 is attained.

Figure 1E:
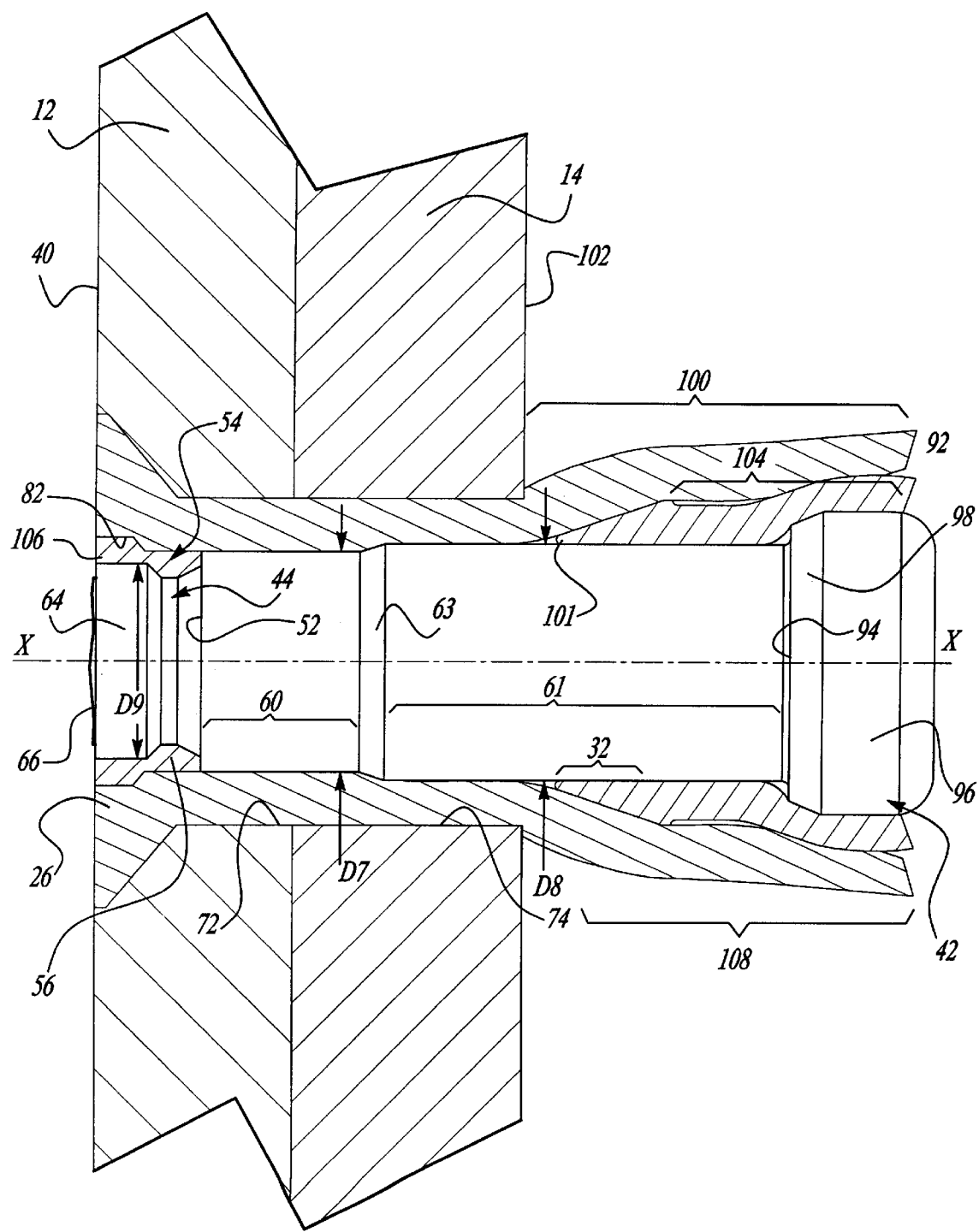

As the pin shank 22 is pulled into the main sleeve 16 and expander sleeve 18, the first pin shank portion 60 will be moved into the reduced diameter bore portion 78 of main sleeve shank 28 while, as noted, the second, hole fill pin shank portion 61 will continue to be moved into the enlarged diameter bore portion 76 of main sleeve shank 28 and partially into the reduced diameter bore portion 61. Depending upon the relative diameters an overall final snug fit or slight interference could be provided to radially expand the main sleeve shank 28 generally into full engagement with the workpiece bores 72 and 74. However, after the full formation of the lock flange 106 the pin shoulder 63, as noted, will be in expansive engagement with the small diameter bore portion 78 through overriding engagement of the sleeve shoulder 80 which along with the engagement of the pin stop shoulder 66 with the anvil washer 20 will stop further movement of the pin member 24 at which time the breakneck groove 62 will be fractured resulting in the installation being completed as shown in FIG. 1e. At this point a multiple blind head assembly 108 is fully formed and includes the locking and strength interaction of the first blind head 100, the second blind head 104, the pin head 42 and adjacent pin shank portion 61. The severed portion of the pin shank 22 and the anvil washer 20 will be discarded.

It should be noted that after final installation upon full formation of the lock flange 106 and the fracture of the breakneck groove 62 the annular land 64, of a diameter D9, will be in line with the recess 82 in the sleeve head 26 to define a restricted cavity which cooperates with the lock groove 44 to secure the lock collar 54 and hence to positively lock the pin member 24 to the main sleeve 16 at the outer end.

In the formation of the first tulip shaped blind head 100 it is desirable that the expander sleeve 18 and particularly the tapered expansion section 32 have sufficient strength to resist deformation which could impede the desired radial expansion of the blind head section 30. Thus in one form of the invention the expander sleeve 18 was made of a harder material structure than the main sleeve 16. For example both the main sleeve 16 and expander sleeve 18 were made of Monel-400 but with the main sleeve 16 being annealed to a desired lower hardness and strength relative to the expander sleeve 18. Thus in the above case the main sleeve 16 had a hardness of around 40 when measured using a 15N hardness scale while the expander sleeve 18 had a hardness of around 60 on the same scale. In this regard it should be understood that the overall hardness of the main sleeve 16 could be maintained with local annealing only of the blind head section 30 to facilitate radial expansion by the expansion section 32. It should also be noted that in this particular form the pin member 24 and locking collar 54 were made of an even stronger material, i.e. A286 Stainless Steel. In one case the hardness of the pin member 24 was around 77 on the 15N scale and locking collar 54 was around 65 on the same scale.

As noted, in order to facilitate movement of the tapered expansion section 32 into the blind head section 30 the taper angle A of the internal tapered bore segment 84 of the blind head section 30 was generally no less than the taper angle B of the external taper of the expansion section 32. The nesting fit of the expansion section 32 within the tapered bore segment 84 also facilitates a more compact pre-assembly of the expander sleeve 18 and main sleeve 16 whereby the length of the pin shank 22 can be minimized. Thus in one form of the fastener 10 the taper angle A of tapered bore segment 84 was selected to be around 30° while the taper angle B of the expansion section 32 was selected to be between around 15° to around 17°, but preferably no greater than 30°. Such dimensions could vary with diameter. (See FIG. 5.)

It should also be noted that the pin head 42 will move substantially completely within the expander sleeve 18 over the grip range of the fastener 10. At the same time the expander sleeve 18 will be in partial engagement with the pin head shoulder 94 while overengaging the pin head 42. In this regard, the tapered pin head section 98 is tapered at an angle C which facilitates and limits the extent of the radial expansion of the expander sleeve shank portion 88 whereby the second blind head 104 will be resiliently urged radially inwardly to maintain substantial engagement over the pin head 42. In this regard the diameter D10 of straight pin head portion 96 is the maximum diameter of the pin head 42 and is less than the outside diameter D5 of the straight shank portion 88 to facilitate the overengagement of the pin head 42 by the shank portion 88.

The taper angles A and B and diameters D1 and D3 of the expansion section 32 are selected to facilitate radial expansion of the blind head section 30 while providing sufficient wall thickness of the expansion section 32 to resist excessive compression onto the pin shank portion 61 which could result in excessively high installation loads.

Thus the blind head assembly 108 has improved strength resulting from the interengagement of the expander sleeve 18 within the main sleeve 16 with the leading end 101 of the expansion section 32 located very proximate to the blind side surface 102 of the inner workpiece 14. Also the high strength of the expander sleeve 18 also assists in such improved blind head strength as does the formation of the second blind tulip head 104 and overengagement of the pin head 42 by the expander sleeve 18. All of the above factors contribute to forming a blind head assembly 108 having a high strength and lock and having a high capability of withstanding the offset axial loads resulting from high lap shear loads.

Thus the fastener 10 herein accomplishes positive mechanical locking of the pin member 24 to the sleeves 16 and 18 without loss of clamp load and with the formation of the multiple locked blind head assembly 108 having a high strength structure which will resist deformation from the uneven tensile loads resulting from high lap shear loads.

One form of the invention as described and of the materials noted was constructed as follows:

| DIMENSIONS IN INCHES AND DEGREES | | |
|---|---|---|
| Main Sleeve 16 | | |
| Sleeve Shank 28 | | |
| Outside Diameter | D4 | 0.142 |
| Enlarged Bore Portion 76 | D2 | 0.104 |
| Wall Thickness | t1 | 0.019 |
| Bore Portion 78 | D6 | 0.095 |
| Wall Thickness | t4 | 0.0235 |
| Tapered Segment 84 Angle | A | 30° |
| Expander Sleeve 18 | | |
| Leading End 101 Diameter | D1 | 0.113 |
| Tapered End Diameter | D3 | 0.138 |
| Wall Thickness | t3 | 0.0165 |
| Shank Portion 88, Outside Diameter | D5 | 0.136 |
| Through Bore 86 Diameter | D2' | 0.105 |
| Wall Thickness | t2 | 0.015 |
| Tapered Section 32 Angle | B | 17° |
| Pin Member 24 | | |
| Pin Shank Portion 60, Diameter | D7 | 0.095 |
| Pin Shank Portion 61, Diameter | D8 | 0.103 |
| Annular Land 64, Diameter | D9 | 0.084 |
| Pin Head, Straight Portion 96, Diameter | D10 | 0.130 |
| Pin Head, Tapered Section 98, Angle | C | 23° |
| Pin Head Shoulder 94, Radial Length | 1 | 0.008 |

While it will be apparent that the preferred embodiments of the invention disclosed are well calculated to fulfill the objects stated above, it will be appreciated that the invention is susceptible to modification, variation and change without departing from the proper scope or fair meaning of the invention.

What is claimed is:

1. A blind fastener for securing workpieces having aligned bores with the workpieces having an open surface at an open side and a blind surface at a blind side, said fastener adapted to secure such workpieces varying in total thickness over a predetermined range of thicknesses or grip length, said fastener comprising:

a pin having an elongated pin shank with an enlarged pin head at the blind end of said pin shank and having gripping means at the opposite end adapted to be gripped by an installation tool for the application of a relative axial pulling force, a cylindrical main sleeve having an enlarged sleeve head adapted to be in engagement with the open surface of the workpieces and having a sleeve shank portion adapted to extend through the workpiece bores and having a blind head section located at the blind surface of the workpieces, said main sleeve having a main sleeve through bore and being supported on said pin shank, a cylindrical expander sleeve having an expander sleeve through bore and located on said pin shank between said pin head and said blind head section of said main sleeve, said expander sleeve adapted to move into said main sleeve through bore at said blind head section of said main sleeve to radially expand it to form a first tulip shaped blind head for clamping the workpieces together in response to a relative axial force of a first magnitude applied between said pin and said main sleeve through engagement of said pin head with said expander sleeve, the relative axial force being applied by the installation tool between said main sleeve and said pin by gripping engagement of said gripping means and engagement of an anvil member with said enlarged sleeve head, said pin head adapted to move into said expander sleeve bore of said expander sleeve in response to a second magnitude of relative axial force greater than said first magnitude to radially expand it to form a second tulip head to further clamp the workpieces and to secure said pin, said main sleeve and said expander sleeve together at that end, said pin having an annular lock groove on said pin shank within the grip length of said fastener, an annular lock collar located in said lock groove in said pin shank initially completely inside said main sleeve and axially spaced from said enlarged sleeve head, a locking boss on said lock collar held in said lock groove whereby said lock collar moves with said pin shank through said main sleeve, said lock collar having a lock sleeve portion extending axially from said locking boss outside of said lock groove, said main sleeve head having a recess at its outer end, said lock sleeve portion adapted to engage the anvil member in response to a third magnitude of relative axial force to upset said lock sleeve portion radially outwardly into said recess of said main sleeve head to lock said pin and said main sleeve together, a breakneck groove on said pin shank axially spaced from said lock collar whereby upon further increase in the magnitude of relative axial force said pin shank will fracture at said breakneck groove, said expander sleeve having a generally axially straight cylindrical sleeve portion having a generally radially, transverse straight, flat end surface with a width of a preselected wall thickness, said pin head having a generally radially straight, transverse flat pin head shoulder adapted to engage said flat end surface, said pin head having a radially outwardly tapered connecting portion connecting said pin head shoulder to an enlarged diameter head portion, said flat pin head shoulder being of a radial length relative to the width of said flat end surface whereby movement of said pin head into said straight sleeve portion will be resisted until attainment of said second magnitude of relative axial force with such movement facilitated at said second magnitude.

2. The blind fastener of claim 1, with said pin shank having a stop shoulder of larger diameter than the portion of said pin shank between said breakneck groove and said gripping means for engaging the anvil member upon completion of upsetting of said lock sleeve portion to stop the movement of said pin shank relative to said main sleeve, the spacing between said breakneck groove and said pin head being within the range of the grip length of said fastener whereby the relative movement therebetween is stopped by said stop shoulder when said stop shoulder is substantially in line with the outer surface of said enlarged sleeve head.

3. The blind fastener of claim 1 with said main sleeve through bore having a straight bore portion with a radially outwardly tapered bore portion at said blind head section, said expander sleeve having an expansion section connected to said cylindrical sleeve portion, said expansion section having a radially outwardly tapered outer surface adapted to fit generally matingly within said tapered bore portion of said blind head section of said main sleeve whereby said expansion section is moved into said main sleeve at said blind head section in response to said relative axial force of the first magnitude to form said first tulip shaped blind head.

4. The blind fastener of claim 3 with said expansion section of said expander sleeve having a leading end of an outer diameter greater than the diameter of said straight bore portion adjacent said tapered bore portion with said leading end located proximate to the blind surface of the workpieces upon final formation of said first tulip shaped blind head.

5. The blind fastener of claim 1 with said main sleeve through bore having a straight bore portion with a radially outwardly tapered bore portion at said blind head section, said expander sleeve having an expansion section connected to said straight cylindrical sleeve portion, said expansion section having a radially outwardly tapered outer surface adapted to fit generally matingly within said tapered bore portion of said blind head section of said main sleeve whereby said expansion section is moved into said main sleeve at said blind head section in response to said relative axial force of the first magnitude to form said first tulip shaped blind head, said straight cylindrical sleeve portion of said expander sleeve having a preselected wall thickness adapted to resist buckling and to facilitate movement of said pin head into said straight sleeve portion in response to said second magnitude of relative axial force.

6. The blind fastener of claim 1 with said flat pin head shoulder being of a radial length less than the width of said flat end surface whereby movement of said pin head into said straight sleeve portion will be resisted until attainment of said second magnitude of relative axial force with such movement facilitated at said second magnitude.

7. The blind fastener of claim 6 with said tapered connecting portion adapted to facilitate radial expansion of said cylindrical sleeve portion to form said second tulip head in partial overengagement with said enlarged diameter pin head portion.

8. The blind fastener of claim 6 with the length of said flat pin head shoulder being approximately one half of the width of said flat end surface of said cylindrical sleeve portion.

9. The blind fastener of claim 6 with said through bore of said main sleeve having an enlarged diameter portion at said blind head section connected to a reduced diameter portion extending from said enlarged sleeve head with an expansion sleeve shoulder located at the juncture of said enlarged diameter bore portion and said reduced diameter bore portion, said pin shank being of a stepped construction and having an enlarged diameter shank portion extending from said pin head to a reduced diameter shank portion with an expansion pin shoulder located at the juncture of said enlarged diameter shank portion and said reduced diameter shank portion, said enlarged diameter shank portion being located within and adapted to fit substantially matingly within a straight through bore in said expander sleeve and within said enlarged diameter bore portion of said main sleeve, said reduced diameter shank portion adapted to fit matingly within said reduced diameter bore portion of said main sleeve, said expansion pin shoulder initially axially spaced from said expansion sleeve shoulder and adapted to move into engagement with said expansion sleeve shoulder as said pin is moved axially relative to said main sleeve in response to the relative axial force and to radially outwardly expand said main sleeve at said reduced diameter portion of said sleeve through bore to move said main sleeve shank portion into hole filling engagement with at least one of the workpiece bores.

10. The blind fastener of claim 9 with said reduced diameter shank portion terminating at said breakneck groove with a substantially radially flat shoulder defining the inner end of said lock groove adapted to engage said lock collar, a reduced diameter annular land located at the opposite outer end of said breakneck groove and extending axially to said breakneck groove and terminating in a radially flat stop shoulder adapted to engage the anvil member at said enlarged sleeve head to stop further axial movement of said pin relative to said main sleeve whereby the magnitude of the relative axial force will increase further until said breakneck groove is fractured completing the installation.

11. A blind fastener for securing workpieces having aligned bores with the workpieces having an open surface at an open side and a blind surface at a blind side, said fastener adapted to secure such workpieces varying in total thickness over a predetermined range of thicknesses or grip length, said fastener comprising:

a pin having an elongated pin shank with an enlarged pin head at the blind end of said pin shank and having a gripping portion at the opposite end adapted to be gripped by an installation tool for the application of a relative axial pulling force, a cylindrical main sleeve having an enlarged sleeve head adapted to be in engagement with the open surface of the workpieces and having a sleeve shank portion adapted to extend through the workpiece bores and having a blind head section located at the blind surface of the workpieces, said main sleeve having a main sleeve through bore and being supported on said pin shank, a cylindrical expander sleeve having an expander sleeve through bore and located on said pin shank between said pin head and said blind head section of said main sleeve, said expander sleeve adapted to move into said main sleeve through bore at said blind head section of said main sleeve to radially expand it to form a first tulip shaped blind head for clamping the workpieces together in response to a relative axial force of a first magnitude applied between said pin and said main sleeve through engagement of said pin head with said expander sleeve, said pin head adapted to move into said expander sleeve bore of said expander sleeve in response to a second magnitude of relative axial force greater than said first magnitude to radially expand it to form a second tulip head to further clamp the workpieces and to secure said pin, said main sleeve and said expander sleeve together at that end, said expander sleeve having a generally axially straight cylindrical sleeve portion having a generally radially, transverse straight, flat end surface with a width of a preselected wall thickness, said pin head having a generally radially straight, transverse flat pin head shoulder adapted to engage said flat end surface, said pin head having a radially outwardly tapered connecting portion connecting said pin head shoulder to an enlarged diameter head portion, said flat pin head shoulder being of a radial length relative to the width of said flat end surface whereby movement of said pin head into said straight sleeve portion will be resisted until attainment of said second magnitude of relative axial force with such movement facilitated at said second magnitude, separate locking means for locking said pin, said main sleeve and said main sleeve together upon completion of installation of said fastener.

12. The blind fastener of claim 11 with said main sleeve through bore having a straight bore portion with a radially outwardly tapered bore portion at said blind head section, said expander sleeve having an expansion section connected to said straight cylindrical sleeve portion, said expansion section having a radially outwardly tapered outer surface adapted to fit generally matingly within said tapered bore portion of said blind head section of said main sleeve whereby said expansion section is moved into said main sleeve at said blind head section in response to said relative axial force of the first magnitude to form said first tulip shaped blind head.

13. The blind fastener of claim 12 with said expansion section of said expander sleeve having a leading end of an outer diameter greater than the diameter of said straight bore portion adjacent said tapered bore portion with said leading end located proximate to the blind surface of the workpieces upon final formation of said first tulip shaped blind head.

14. The blind fastener of claim 11 with said main sleeve through bore having a straight bore portion with a radially outwardly tapered bore portion at said blind head section, said expander sleeve having an expansion section connected to said straight cylindrical sleeve portion, said expansion section having a radially outwardly tapered outer surface adapted to fit generally matingly within said tapered bore portion of said blind head section of said main sleeve whereby said expansion section is moved into said main sleeve at said blind head section in response to said relative axial force of the first magnitude to form said first tulip shaped blind head, said straight cylindrical sleeve portion of said expander sleeve having a preselected wall thickness adapted to resist buckling and to facilitate movement of said pin head into said straight sleeve portion in response to said second magnitude of relative axial force.

15. The blind fastener of claim 11 with said flat pin head shoulder being of a radial length less than the width of said flat end surface whereby movement of said pin head into said straight sleeve portion will be resisted until attainment of said second magnitude of relative axial force with such movement facilitated at said second magnitude.

16. The blind fastener of claim 15 with said tapered connecting portion adapted to facilitate radial expansion of said cylindrical sleeve portion to form said second tulip head in partial overengagement with said enlarged diameter pin head portion.

17. The blind fastener of claim 15 with the length of said flat pin head shoulder being approximately one half of the width of said flat end surface of said cylindrical sleeve portion.

18. A blind fastener for securing workpieces having aligned bores with the workpieces having an open surface at an open side and a blind surface at a blind side, said fastener adapted to secure such workpieces varying in total thickness over a predetermined range of thicknesses or grip length, said fastener comprising:

a pin having an elongated pin shank with an enlarged pin head at the blind end of said pin shank and a gripping portion at the opposite end adapted to be gripped by an installation tool for the application of a relative axial pulling force, a cylindrical main sleeve having an enlarged sleeve head adapted to be in engagement with the open surface of the workpieces and having a sleeve shank portion adapted to extend through the workpiece bores and having a blind head section located at the blind surface of the workpieces, said main sleeve having a main sleeve through bore and being supported on said pin shank, a cylindrical expander sleeve having an expander sleeve through bore and located on said pin shank between said pin head and said blind head section of said main sleeve, said expander sleeve adapted to move into said main sleeve through bore at said blind head section of said main sleeve to radially expand it to form a first tulip shaped blind head for clamping the workpieces together in response to a relative axial force of a first magnitude applied between said pin and said main sleeve through engagement of said pin head with said expander sleeve, said pin head adapted to move into said expander sleeve bore of said expander sleeve in response to a second magnitude of relative axial force greater than said first magnitude to radially expand it to form a second tulip head to further clamp the workpieces and to secure said pin, said main sleeve and said expander sleeve together at that end, said expander sleeve having a generally axially straight cylindrical sleeve portion having a generally radially, transverse straight, flat end surface with a width of a preselected wall thickness, said pin head having a generally radially straight, transverse flat pin head shoulder adapted to engage said flat end surface, said pin head having a radially outwardly tapered connecting portion connecting said pin head shoulder to an enlarged diameter head portion, said flat pin head shoulder being of a radial length relative to the width of said flat end surface whereby movement of said pin head into said straight sleeve portion will be resisted until attainment of said second magnitude of relative axial force with such movement facilitated at said second magnitude, said main sleeve through bore having a straight bore portion with a radially outwardly tapered bore portion at said blind head section, said expander sleeve having an expansion section connected to said straight cylindrical sleeve portion, said expansion section having a radially outwardly tapered outer surface adapted to fit generally matingly within said tapered bore portion of said blind head section of said main sleeve whereby said expansion section is moved into said main sleeve at said blind head section in response to said relative axial force of the first magnitude to form said first tulip shaped blind head, the angle of taper of said tapered outer surface being no greater than the angle of taper of said tapered bore portion.

19. The blind fastener of claim 18 with said blind head section of said main sleeve being made of a material with a lower hardness than the hardness of the material of said expansion section of said expander sleeve whereby formation of said first blind head is facilitated.

20. The blind fastener of claim 18 with said main sleeve being made of a material with said blind head section having a hardness of around 40 on a 15N hardness scale while said expander sleeve was made of a material having a hardness of around 60 on the same scale.

21. The blind fastener of claim 18 with the length of said flat pin head shoulder being approximately one half of the width of said flat end surface of said cylindrical sleeve portion.

22. The blind fastener of claim 18 with the length of said flat pin head shoulder being approximately one half of the width of said flat end surface of said cylindrical sleeve portion, said straight sleeve portion having a preselected wall thickness adapted to resist buckling and to facilitate movement of said pin head into said straight sleeve portion in response to said second magnitude of relative axial force.

* * * * *

UNITED STATES PATENT AND TRADEMARK OFFICE
CERTIFICATE OF CORRECTION

PATENT NO.    : 6,077,009
DATED         : June 20, 2000
INVENTOR(S)   : David J. Hazelman Page 1 of 1

It is certified that error appears in the above-identified patent and that said Letters Patent is hereby corrected as shown below:

References Cited

U.S. PATENT DOCUMENTS 4,557,649     12/1985     Jeal
4,815,906     3/2/1989    Binns
5,052,870     10/1/1991   Pratt et al Column 10, Claim 1,
Line 6, delete "being" and substitute therefor -- adapted to be --.

Signed and Sealed this

Twenty-fifth Day of September, 2001

Attest:

NICHOLAS P. GODICI

Attesting Officer

Acting Director of the United States Patent and Trademark Office